April 22, 1952 R. H. D. CHAMBERLIN ET AL 2,593,536
FUEL METERING AND AIRSCREW PITCH CONTROL MECHANISM
Filed Aug. 5, 1947 5 Sheets-Sheet 1

FIG. 1.

Inventor
R.H.D. Chamberlin
C.H.L. Wynne and John Skellern
Emery, Holcombe & Blair
Attorney

April 22, 1952     R. H. D. CHAMBERLIN ET AL     2,593,536
FUEL METERING AND AIRSCREW PITCH CONTROL MECHANISM
Filed Aug. 5, 1947

April 22, 1952   R. H. D. CHAMBERLIN ET AL   2,593,536
FUEL METERING AND AIRSCREW PITCH CONTROL MECHANISM
Filed Aug. 5, 1947   5 Sheets-Sheet 5

Inventor
R.H.D.Chamberlin, C.H.L.
Wynne and John Skellern
Emery, Holcombe & Blair
Attorney Patented Apr. 22, 1952

2,593,536

UNITED STATES PATENT OFFICE 2,593,536

FUEL METERING AND AIRSCREW PITCH CONTROL MECHANISM

Reginald Henry Douglas Chamberlin and Charles Horace Lionel Wynne, London, and John Skellern, Northolt, England, assignors to D. Napier & Son Limited, London, England, a company of Great Britain Application August 5, 1947, Serial No. 766,259
In Great Britain July 1, 1946

Section 1, Public Law 690, August 8, 1946
Patent expires July 1, 1966

5 Claims. (Cl. 170—135.74)

This invention relates to apparatus for metering the fuel supplied to a prime mover in a power unit of the type comprising a compressor which delivers air to one or more chambers in which fuel is burnt, the products of combustion from these chambers flowing to and acting on a turbine which drives the compressor and also an air screw, the power unit being designed more especially for use in an aircraft.

The present invention concerns the provision of means for effecting a stability control in fuel metering apparatus as described in the specification of the present applicants' copending application for United States Letters Patent Ser. No. 758,440, now Patent No. 2,479,813. In that apparatus there is a metering orifice the dimensions of which in directions at right angles are determined by two relatively movable members. A variable delivery fuel pump driven by and in speed relation to the prime mover, delivers fuel to the metering orifice. The dimensions of the metering orifice are varied on the one hand by movement of one member in accordance with the temperature of the air at the intake to or at some point in the compressor in the power unit, and on the other hand by the movement of another member by a servo motor controlled in accordance with the speed of the prime mover in association with the pressure at which the fuel is supplied to the pump. The volumetric delivery by the pump is dependent on the differential action of the pressures on the opposite sides of the metering orifice in association with the air pressure at the intake to or at some point in the compressor in the power unit.

With the fuel metering apparatus described in the aforementioned co-pending patent specification, instability may sometimes arise where the apparatus is used in conjunction with a variable pitch airscrew, unless measures are taken to prevent this. This is due to the fact that at a given pitch the power which the airscrew absorbs varies with changes of speed to a lesser extent than does the power output of the turbine with corresponding speed changes. Thus, if, for instance, using a fuel metering apparatus as described in the aforementioned co-pending patent specification, the speed of the prime mover is to be increased, the airscrew pitch must first be reduced in order to enable the turbine to accelerate. At the new speed, however, the airscrew pitch must be greater than it was originally in order that its power absorption shall correspond with the new power output of the turbine. Thus in order to effect a speed change the blades must first be rotated in the opposite direction to that in which they must ultimately be moved. The present invention, on the other hand, enables speed changes to be effected while moving the blades in only one direction.

Another form of stability control apparatus for use in fuel metering apparatus as described in U. S. Patent No. 2,479,813, is described in our co-pending U. S. patent application Serial No. 766,260, now Patent No. 2,536,158, dated January 2, 1951.

According to this invention, in a prime mover of the type indicated, there is combined with fuel metering apparatus as described above, a delayed action servo motor disposed in the control mechanism between the metering unit and the airscrew governor and operative on that governor, a third member which controls the dimensions of the metering orifice and is additional to and movable relatively to the two main members whose movements vary the dimensions of that orifice, and means whereby this third member is moved or set in accordance with the speed of the prime mover both as selected by the control and actual. Whereas in the metering apparatus referred to the size of the metering orifice is mainly determined by the relative movements of two concentric sleeves of which in the inner one there is at least one port, the third member controlling the size of this orifice is also a sleeve and this is movable on the inner and ported sleeve, but coaxially with and movable relatively to the outer sleeve which is also movable on the ported sleeve. The adjusting or setting movement of the third sleeve member may be in the direction of its axis or rotational about that axis.

The constructional details of the apparatus may vary, but the accompanying drawings illustrate by way of example how the invention may be carried out in practice. In these drawings.

Figure 3:
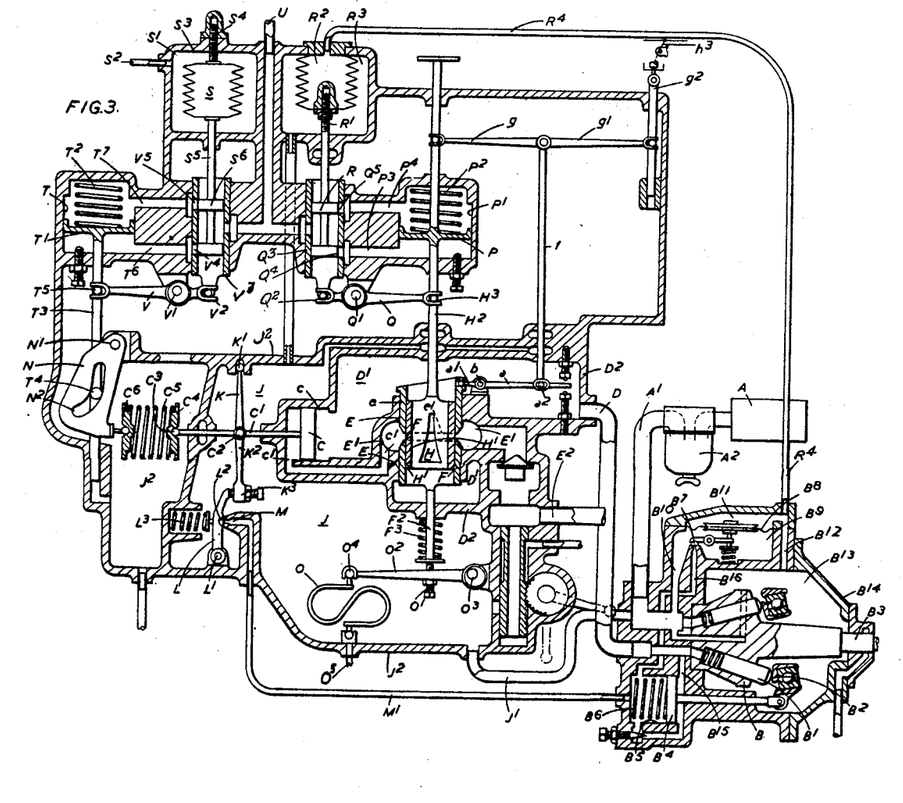
Fig. 3 shows diagrammatically the fuel metering apparatus as described in the specification of our U. S. Patent No. 2,479,813 but with the stabilizing control according to the present invention combined therewith.

It will be convenient in the first place to describe the chief features of the metering apparatus as a whole and as shown diagrammatically in Fig. 3.

The fuel is contained in a tank A from which it is delivered under pressure through a pipe $A^1$ to a fuel pump B, the fuel on its way preferably passing through a filter $A^2$. The pump B is of the variable stroke and delivery type, and conveniently of a known construction as here shown. In this construction the variation of the strokes of the plungers $B^1$ is effected by altering the angular position of a swash plate $B^2$ in relation to the axis about which the pump rotates. The pump shaft $B^3$ is driven by suitable means either directly or indirectly from a rotating part of the prime mover which, as mentioned above, and for example, may be of a known type which includes a turbine driven by the products of combustion from one or more chambers wherein fuel is burnt in air which is delivered thereto by a compressor driven by the turbine. The variation in the stroke of the pump B is effected by a servomotor comprising a piston $B^4$ movable in a cylinder $B^5$ against the action of a spring $B^6$. This servomotor is controlled on the one hand by means dependent on movement derived from a piston C subject in the cylinder c to the differential action of the fluid pressures on the opposite sides of the metering orifice. An abutment for the piston C is adjustable in a manner to be described in dependence on the ram air pressure, that is the pressure at the entry to the compressor of the prime mover. Operation of the servomotor $B^4$, $B^5$ is also controlled by an overspeed control valve $B^7$ actuated in a known manner by the difference in pressures on the opposite sides of a diaphragm $B^8$. The diaphragm is situated in a chamber of which one part $B^9$ on one side of the diaphragm is in communication through a passage $B^{10}$ with the pipe $A^1$ through which the fuel is supplied from the tank A. The other part $B^{11}$ of the chamber enclosing the diaphragm $B^8$ is in communication through a passage $B^{12}$ with a chamber $B^{13}$ within a casing $B^{14}$ which encloses the pump B. Fluid contained in this chamber $B^{13}$ will act on the side of the diaphragm $B^8$ in the chamber $B^{11}$ with a pressure due to centrifugal action of the pump B this pressure being thus determined by the speed at which the pump is rotated, and it is thus in definite relation to the speed of rotation of the prime mover which drives the pump. The overspeed control valve $B^7$ is therefore actuated by the difference between the pressure at which the fuel is delivered to the pump B and a pressure which has a direct relation to the speed of the pump and the prime mover.

The pressures acting on the piston $B^4$ of the servomotor which effects the variation in the stroke of the pump B are on the one hand the pressure at which the fuel is delivered by the pump B through the pipe D which is in communication with one end of the cylinder $B^5$ through a passage $B^{15}$. On the other hand there is acting on the other face of the piston $B^4$ in addition to the spring $B^6$ operating fluid pressure transmitted through a pipe $M^1$. A passageway $B^{16}$ leading from this end of the cylinder $B^5$ terminates in an orifice controlled by the overspeed control valve $B^7$ which thus permits a leak off of the operative fluid pressure in the pipe $M^1$. There is a similar leak-off of this pressure controlled in a manner to be described hereunder by the piston C.

Figure 1:
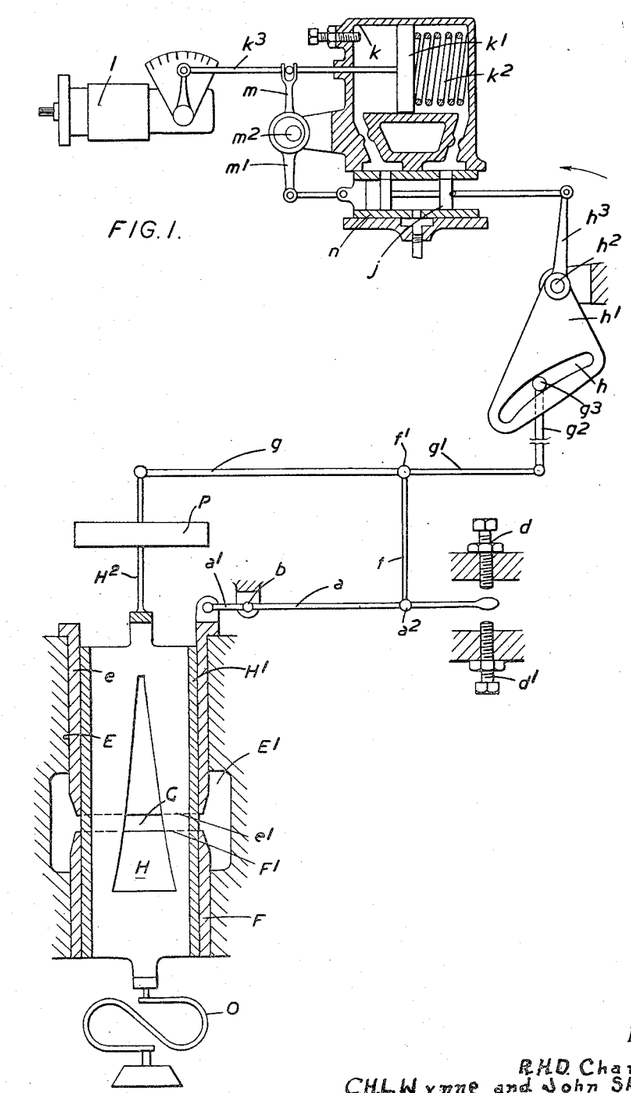
Fig. 1 shows diagrammatically the stabilizing fuel control apparatus in association with the movable members constituting the metering orifice.

The metering orifice seen on an enlarged scale in Figs. 1 and 2 but also illustrated in Figure 3 is preferably constructed and arranged in the following way. The fuel is delivered by the pump B through the pipe D into a chamber $D^1$ within a closed casting $D^2$. In this chamber there is mounted a cylinder E which is open at both ends so that the fuel in the chamber $D^1$ can freely enter the cylinder. About the centre of the length of the cylinder E there is a circumferentially extending port or opening in the wall of the cylinder constituting an annular chamber $E^1$ into which the fuel enters after it is passed through the metering orifice.

In what may be referred to for convenience as the upper end portion of the cylinder E there is a sliding sleeve e having an edge $e^1$ which lies in a plane normal to the axis of the cylinder E and in a position where it extends across the opening into the annular chamber $E^1$. This sliding sleeve e is the third sleeve member referred to above as a feature of the present invention. In the opposite or lower end portion of the cylinder E is a sleeve F which can slide in the cylinder, the upper and inner edge $F^1$ of this sleeve being so positioned that as the sleeve slides this edge will be moved across the opening into the chamber $E^1$. By sliding either or both of the sleeves e, F the gap between the edges $e^1$ $F^1$ of the sliding sleeves which are both straight and lie in planes normal to the axis of the cylinder can be varied in width thereby altering the dimension of the metering orifice G in the direction of the cylinder axis. This gap between the opposed edges $e^1$ $F^1$ of the sliding sleeves e and F extends circumferentially through 360° but only a part of it is effectively open or uncovered for the flow of fuel by a port H in the wall of an inner sliding sleeve $H^1$. The fuel delivered by the pump into the chamber $D^1$ and thus into the interior of the sleeve $H^1$ will flow through the metering orifice G into the annular chamber $E^1$, the dimensions of the orifice G being variable by the relative positioning of the sleeves e, F and $H^1$. The outer sleeve e, F have the same thickness so that the inner surfaces of these two sleeves, together constitute a cylinder of uniform internal diameter in whose wall is a gap the width of which in the axial direction can be varied according to the positions into which the sleeves e and F are moved. In the cylinder thus formed by the sliding sleeves e, F lies and can slide the inner sleeve $H^1$, and the port H in the wall of this sleeve is V-shaped as shown, the apex of this port extending in the direction of the axis of the sleeve, and, for example and as shown in the drawings, in what may be referred to as the upward direction. As it is shown for example in Figure 1 this port H has a shape which resembles an isosceles triangle with a short base and sides which are not straight but similarly and slightly curved inwards towards each other. When this sleeve $H^1$ is in its initial position of rest the centre part in the length of the port lies across the abovementioned circumferential gap which surrounds the sleeve $H^1$ and is formed between the edge $e^1$ of the sleeve $e$ and the edge $F^1$ of the sleeve F. Where the port H and this gap coincide there is formed the metering orifice or passage G whose dimension in the circumferential direction will be varied by sliding the sleeve $H^1$. On the other hand as already mentioned the dimension of this metering orifice G in the axial direction can be varied by sliding either or both of the outer sleeves $e$ and F so as to alter the width of the gap through which the metered fuel is delivered into the annular chamber $E^1$.

In a part of the chamber $D^1$ within the casing $D^2$ which contains the above mentioned parts constituting the variable metering orifice G is the cylinder $c$ in which is the piston C which has been already referred to as effecting the movement of the piston $B^4$. This piston C and cylinder $c$ may be replaced by a pressure sensitive capsule which will function in the same way. For convenience this device may be designated the metering pressure device the piston or capsule being subject on the one hand to the pressure of the fuel as delivered by the pump B, that is, the pressure in the chamber $D^1$ into which as described this fuel is delivered through the pipe D. On the other hand the other end of the cylinder $c$ is filled with fuel which has passed through the metering orifice G, this end of the cylinder being in communication through a passage $c^1$ with the annular chamber $E^1$. Thus at this side the piston C is subjected to the pressure of the fuel after it has passed through the metering orifice G, this being the pressure at which fuel is delivered to the burners.

From the piston C runs a rod $C^1$ which can slide through an opening in the end of the cylinder $c$. A part intermediate in the length of the rod $C^1$ lies in and passes across a closed chamber J which conveniently contains fuel at the pressure at which it left the supply tank A and goes to the pump B. This fuel enters the chamber J through a passage $J^1$ which communicates with the fuel supply pipe $A^1$. A lever extends transversely across this intermediate part in the length of the rod $C^1$ to which the lever is pivotally connected at $C^2$. The end of one arm K of this lever is fulcrumed at $K^1$ in a suitable place in the wall $J^2$ of the chamber J. The other arm $K^2$ of this lever carries at its end an adjustable stud $K^3$ which makes contact with a lever L pivoted at $L^1$ and carrying a valve $L^2$ controlling the opening M at the end of piping $M^1$ leading from the servomotor cylinder $B^5$. When this valve $L^2$ is lifted it allows a leak-off into the chamber J of the fluid pressure acting in the manner described above on one side of the piston $B^4$ of the servomotor which varies the stroke of the fuel pump B. A spring $L^3$ tends to move the lever L in a direction which will keep the valve $L^2$ on its seat in the opening M.

At its outer end $C^3$ the piston rod $C^1$ bears through a cap $C^4$ on one end of a coiled spring $C^5$ whose other end through a cap $C^6$ bears on a cam lever member N pivoted at $N^1$. In this lever member N is a cam slot $N^2$ and movement of this lever, which is effected in a manner to be described, varies the pressure exerted by the spring $C^5$ on the piston C.

In association with the stability device forming the subject of the present invention the movement necessary to alter the dimensions of the metering orifice G are effected on the one hand by variations in the temperature of the air at the intake to the compressor of the power unit, and on the other hand by the speed of the motor in this unit in association with the pressure of the fuel as delivered from the tank A to the fuel pump B. Movement is imparted to the outer sleeve F by a Bourdon tube O which is connected in a known manner to a thermometer, such as a mercury in steel thermometer, situated in the air intake to the compressor (see Fig. 4). A rod $F^2$ runs, for example downwards, from the sleeve F through the wall $D^2$ enclosing the chamber $D^1$ into the chamber J which as mentioned contains fuel at the pressure at which it flows from the tank A to the pump B. The outer end of this rod $F^2$ is acted on by a spring $F^3$ which tends to move the sleeve F downwards, that is in a direction which will increase the width of the gap between the edge $F^1$ of the sleeve F and the edge $e^1$ of the sleeve $e$, this movement thus increasing the dimension of the metering orifice G in the direction of the sleeve axis. The end of the rod $F^2$ bears on an adjustable stud $O^1$ on a lever $O^2$ fulcrumed at $O^3$ in an eccentric bearing which permits adjustment. The free end $O^4$ of the lever $O^2$ is connected to one of the Bourdon tube O, the other end of this tube being carried by the wall $J^2$ of the chamber J and suitably connected to the thermometer.

From the upper end of the inner sleeve $H^1$ a rod $H^2$ passes through the wall $D^2$ of the chamber $D^1$ and is connected to the piston P of a servomotor. This piston P can move in a cylinder $P^1$ and is acted on by a spring $P^2$ which through the piston P tends to move the sleeve $H^1$ in a direction which, owing to the shape and disposition of the port H, will reduce the size of the metering orifice G. At a point $H^3$ in its length this rod $H^2$ is connected to the end of one arm Q of a lever which is pivoted at $Q^1$ in an eccentric bearing which permits of adjustment. The other arm $Q^2$ of this lever is connected to a ported sleeve $Q^3$ within which lies and can move a piston valve R. The sleeve $Q^3$ and the valve R together control the flow of pressure fluid to and from the ends of the cylinder $P^1$ of the servomotor, this flow taking place through passages $P^3$ and $P^4$. Movement of the sleeve $Q^3$ varies the positions of ports $Q^4$ and $Q^5$ in this sleeve in relation to the ends of the passages $P^3$, $P^4$, thus varying the control of the flow through these passages as effected by the piston R. The piston R is connected through a rod $R^1$ to a pressure sensitive capsule $R^2$ disposed in a chamber $R^3$ which is in communication with the chamber J, which as already mentioned is in communication with the fuel supply pipe $A^1$ so that the chamber $R^3$ contains fuel at the pressure at which it is delivered from the tank A to the pump B. At the end opposite to that which is connected to the rod $R^1$ the capsule $R^2$ abuts against the wall of the chamber $R^3$ and the interior of the capsule is connected through piping $R^4$ and passage $B^{12}$ with the chamber $B^{13}$ in which rotates the fuel pump B. The interior of the capsule $R^2$ is thus subjected to pressure due to the centrifugal force set up by the liquid in the chamber $B^{13}$ and this is a pressure which varies according to the speed of rotation of the pump B which is related to the speed of rotation of the prime mover.

Movement is imparted to the third sleeve $e$ in the following way. A two-armed lever $a$ $a^1$ fulcrumed at $b$ has the end of one arm $a^1$ connected to the sleeve $e$ while the end of the other arm $a$ moves between adjustable studs $d$ $d^1$. At a point $a^2$ in its length the arm $a$ is connected by a link $f$ with a point $f^1$ in the length of a floating lever $g$ $g^1$, the end of the arm $g$ of this lever being connected to the rod $H^2$ which runs between the inner sleeve $H^1$ and the piston P of the servomotor which moves that sleeve. A guided rod $g^2$ which runs from the end of the arm $g^1$ of the floating lever has at its end a roller $g^3$ which lies in a cam slot $h$ in a plate $h^1$ forming one arm of a manually movable control lever pivoted at $h^2$ and having second arm $h^3$ connected to a piston valve $j$. This valve controls the flow of pressure fluid to a servomotor cylinder $k$ the piston $k^1$ in this cylinder having a spring $k^2$ acting on one side thereof. This servomotor, which may be referred to as the delay action servomotor, effects an adjustment of the airscrew governor $l$ through a rod $k^3$ running from the piston $k^1$ of the servomotor. One arm $m$ of a lever is connected to the piston rod $k^3$ while the other arm $m^1$ of this lever is connected to a ported sleeve $n$ within which moves the piston valve $j$, the lever $m$ $m^1$ being pivoted at $m^2$ in an eccentric bearing which permits of adjustment.

Movement of the control lever $h^3$ acting through the cam $h$ effects a setting at one end of the floating lever $g$ $g^1$ according to selected revolutions per minute and it simultaneously moves the valve $j$ of the servo motor $k$ $k^1$, thereby causing a corresponding setting of the air screw governor $l$, but only after a certain delay, since the valve $j$ must in any case move before the movement of the piston $k^1$ can begin. The rate at which the piston $k^1$ responds to the movement of the valve $j$ is determined by constrictions in the passages through which the pressure medium flows into or out of the servomotor cylinder. The rate of delay is arranged so that the response of the piston rod $k^3$ to movements of the speed control lever $h^3$ is slower than the response of the prime mover to such movements. The other end of the floating lever $g$ $g^1$ will receive a movement in accordance with actual revolutions per minute owing to its connection to and movements by the speed servo motor P $P^1$ which moves the inner ported sleeve $H^1$ controlling the dimensions of the metering orifice G. As mentioned above the servo motor P $P^1$ in the metering apparatus is controlled through its valve R by the capsule $R^2$ acted on externally by the pressure at which the fuel is supplied through the pipe $A^1$ to the pump B and internally by a pressure which varies in accordance with the speed of the prime mover.

Assuming steady running of the prime mover in an aircraft at, say, 14,000 R. P. M. under static standard conditions at sea level, then if an increase in speed be selected the effect obtained with the present mechanism will be as follows and as represented diagrammatically in Figure 2. The speed control lever $h^3$ being moved rapidly to the position for the new selected speed and through the cam $h$ acting through the rod $g_2$ on one end of the floating lever $g$ $g^1$, will turn that lever about its opposite end where it is connected to the piston P of the speed servo motor which sets the inner ported sleeve $H^1$ of the metering device. This will move the sleeve $e$ to which the floating lever $g$ $g^1$ is connected through the link $f$ and the lever $a$ $a^1$, with the result that the dimension of the metering orifice G in the axial direction will be increased and this will cause a percentage increase in the fuel flow. In consequence of this there will be an increase in the engine torque followed by an increase in speed which in turn will affect the air screw governor which will bring about an increase in propeller pitch. Now as the actual revolutions per minute increase to accord with the selected revolutions per minute, the ported sleeve $H^1$ will be moved by the servo motor P $P^1$ which as mentioned is controlled by factors of which one is speed, and this movement will cause the area of the metering orifice G, as far as it is controlled by the sleeve $H^1$, to increase in accordance with the increasing actual speed. At the same time however the percentage increase obtained by virtue of the movement of the sleeve $e$ as above mentioned will be cancelled out owing to the return movement imparted to the sleeve $e$ as the floating lever $g$ $g^1$ is moved through its connection to the speed servo motor P $P^1$. Independently the delayed action servo motor $k$ $k^1$ will move the spindle $k^3$ controlling the airscrew governor $l$ to its new setting, but as stated above the selected R. P. M. at the air screw governor will always be slightly behind the actual R. P. M. of the prime mover during acceleration and deceleration. This is essential to prevent the governor-actuated pitch control valve from interrupting the flow of pressure fluid to the increase pitch side of the piston actuating the airscrew pitch changing mechanism. In practice a slight over-run will tend to occur which will be restrained by the fuel control. However the general result will be that anticipatory over-fueling combined with the delayed action response at the air screw governor control $k^3$ will have permitted an increase in the selected speed without initial movement of the air screw blades in the wrong direction.

Figure 2:
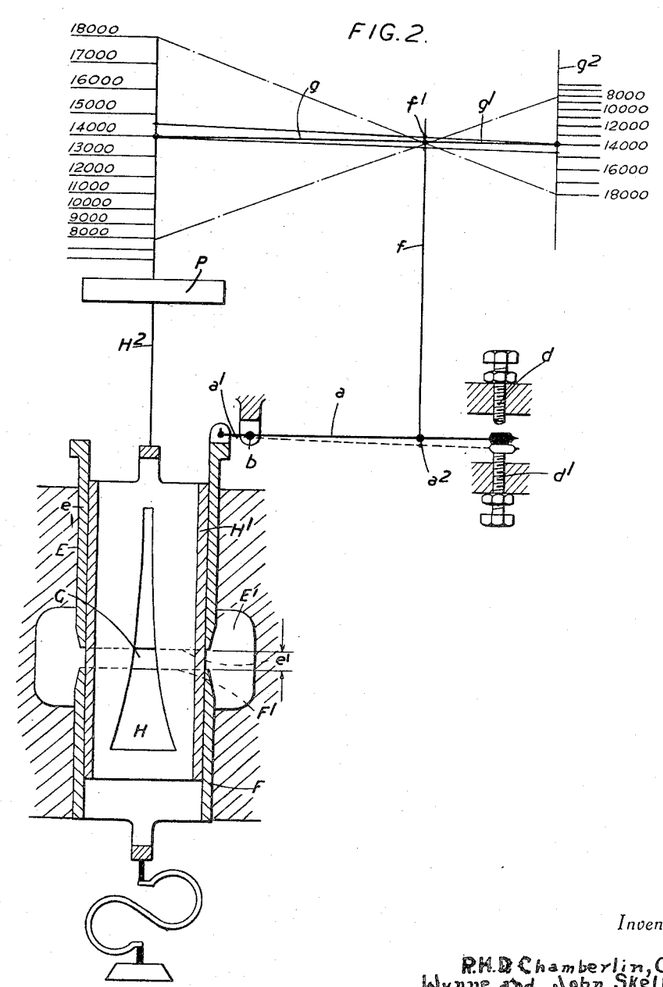
Fig. 2 illustrates diagrammatically the operation of the apparatus shown in Fig. 1.

In Figure 2 the scale of figures along the rod $H^2$ connecting the servo piston P to the inner ported sleeve $H^1$ represent a scale of square law travel for actual R. P. M. On the other hand the scale indicated at the righthand side of Figure 2 along the end of the arm $g^1$ of the floating lever represents a scale of square law travel for selected R. P. M., movement of this scale being in accordance with movements of the control lever $h^3$ in selecting revolutions per minute.

Considering now another set of conditions, it will be assumed that the aircraft in which the prime mover is installed is flying at an altitude above sea level on an accurate governor at, say 14,000 R. P. M. under level flight conditions. The dimension of the metering orifice G in the axial direction of the controlling sleeves $H^1$, F and $e$ will have increased owing to the fall in temperature causing movement of the sleeve F. There will also be a lowered metering pressure due to a fall in the intake pressure from static sea level conditions. If the aircraft enters a dive and the resultant increase in forward speed causes an increase in the R. P. M. of the prime mover, two separate movements in the mechanism will take place. The increase in actual R. P. M. will affect the air screw governor which will call for an increase in propeller pitch. This may suffice if the rate of change of pitch is adequate to meet the increased power output which would occur if the anticipatory fuel control were not operative. This control however lessens the burden on the airscrew governor by reducing the fuel supply by an amount which increases as the overspeed increases, and only restores the fuel supply to normal when the governor has restored the speed of the prime mover to that which has been selected.

The actual movements in the anticipatory fuel control mechanism are as follows. The increase in the actual speed will take effect through the speed servo motor $P$ $P^1$ and will move the end $g$ of the floating lever while the opposite end $g^1$ of that lever is maintained in its position since the manual control lever $h^3$ for selecting speed has not been moved. This movement of the floating lever $g$ $g^1$ will move the sleeve $e$ and thereby reduce the dimension of the metering orifice G in the axial direction. The lever $a$ $a^1$ through which movement is transmitted to the sleeve $e$ may be so constructed that the decrease in the area of the metering orifice G caused by movement of the sleeve $e$ will be enough to partially, fully or more than cancel out the increase in the area of the orifice G which would otherwise result from the movement of the sleeve $H^1$ by the speed servo motor $P$ $P^1$. In this way for an actual over-speed there is attained a decrease in the area of the metering orifice. Therefore an over-speed which has not been selected is restrained by the improved fuel control mechanism until the air screw governor takes command. Then as the actual R. P. M. are brought down to the selected R. P. M. under governor control, the normal fuelling is restored.

Reverting to the main part of the metering apparatus shown in Fig. 3, certain features not hitherto mentioned may now be described. An exhausted pressure sensitive capsule S is disposed in a chamber $S^1$ which is subjected through piping $S^2$ to the air pressure, commonly referred to as the ram pressure, at the intake to the compressor in the power unit. Where this unit is installed in an aircraft this ram pressure at the intake will be much above the normal atmospheric pressure so long as the aircraft is in flight. At one end this capsule S bears against an abutment constituted by the wall $S^3$ of the casing enclosing the chamber $S^1$ and while this abutment is in effect fixed it is as shown adjustable by the screw $S^4$ for primary setting purposes. At its other end the capsule S is connected through a rod $S^5$ to a piston valve $S^6$ which controls the flow of pressure fluid to the cylinder T of a servo motor. This pressure fluid is supplied through a pipe U from a suitable source both to the servo motor T and to the servo motor $P$ $P^1$. The piston $T^1$ in the cylinder T has a spring $T^2$ acting on one side of it and from the opposite side runs a rod $T^3$ which is suitably guided where it passes through the end of the cylinder T and at its outer end in the wall of the casing of the apparatus. At a convenient point in the length of the piston rod $T^3$ is a pin or roller $T^4$ which engages the cam slot $N^2$ in the lever N. At another point $T^5$ in the length of the piston rod $T^3$ it is connected to one arm V of a lever pivoted at $V^1$ in an eccentric bearing, the other arm $V^2$ of this lever being connected to a ported sliding sleeve $V^3$ within which moves the piston valve $S^6$. Movement of the sleeve $V^3$ will set the ports $V^4$ $V^5$ therein in relation to the piston valve $S^6$ and the passages $T^6$ $T^7$ through which the pressure liquid flows from the piping U to the opposite ends of the servo cylinder T. Movement of the piston $T^1$ of this servo motor will thus not only adjust the position of the sleeve $V^3$ but also through the cam lever N vary the strength of the spring $C^5$ which constitutes an abutment for the metering pressure piston C. In this way the spring $C^5$ will be automatically adjusted in accordance with the air pressure at the intake to the compressor in the power unit.

The anticipatory fuel control unit combined with the delayed action air screw governor controlled servo motor $k$ $k^1$ as above described will function as a stabilizing control for a prime mover having a fuel metering system such as indicated and described more particularly with reference to Fig. 3 and in our United States patent, No. 2,479,813, mentioned above. The present invention also serves to prevent encroachment on the surge boundary due to over-fueling during accelerations. It will also operate as a maximum acceleration and deceleration control and the adjustments will admit of the obtaining of the maximum acceleration and deceleration of which the prime mover is capable, but will not allow such acceleration and deceleration to be exceeded. The anticipatory fuel unit in the form described above wherein the sleeve $e$ is movable in the axial direction is, however, sensitive to the air screw governor characteristic tolerance and may tend to give inadequate speed metering accuracy.

Figures 4, 6:
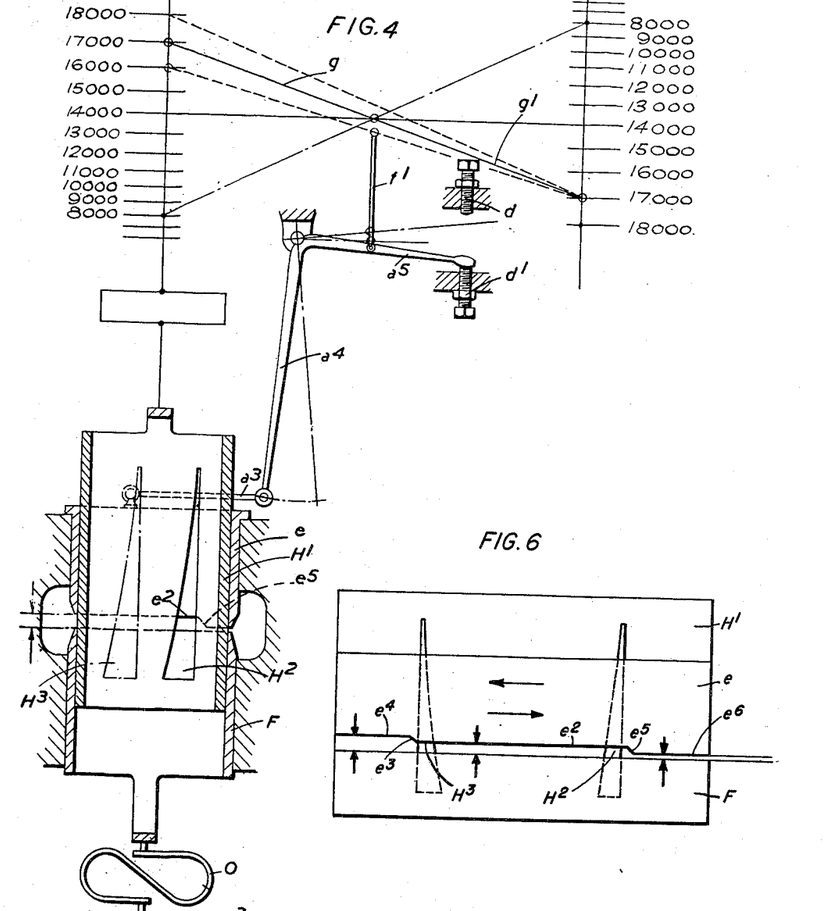
Fig. 4 is a diagrammatic view similar to Fig. 2 but showing the third sleeve associated with the metering orifice arranged so as to be rotatable instead of being reciprocated.
Fig. 6 is a projection on the flat illustrating the relationship between the stepped edge of the rotatable third sleeve and oppositely positioned ports in the inner sliding sleeve.
Figure 5:
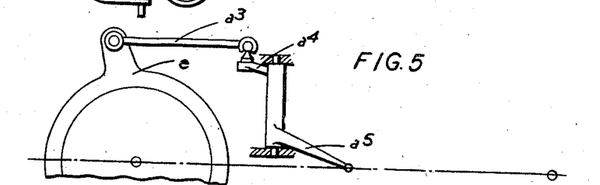
Fig. 5 is a plan showing the arrangement of the levers by means of which rotation is imparted to the third sleeve.

This difficulty may be overcome by employing an alternative form of apparatus as indicated in Figures 4, 5 and 6 in which the sleeve $e$ is constructed and arranged so that it may be rotated to effect its adjustment. In this case the end or edge of the sleeve $e$ is otherwise than straight as it is when the sleeve is movable in the axial direction. This edge may be inclined but preferably it is stepped as shown and co-operates with an inner sleeve $H^1$ provided with two ports $H^2$, $H^3$ spaced 180° apart the shape of each of these ports being conveniently similar to one half of the single port H, that is to say as if this port is divided by a line running through its centre in the axial direction.

Thus, with such a rotatably adjustable sleeve $e$ and with similar but "mirror image" ports in the sleeve $H^1$ spaced 180° apart, the edge of the sleeve $e$ conveniently has a part $e^2$ which is straight, that is to say lies in a plane normal to the sleeve axis and extends between two points so spaced apart that in one rotational position of the sleeve relatively to the sleeve $H^1$ this straight portion $e^2$ of the edge will lie similarly across the two oppositely positioned ports $H^2$, $H^3$ as shown in Figure 6. Thus, in this position of the sleeve $e$ the gap between its edge $e^2$ and the opposed edge of the sleeve F will be the same where this gap cuts across each of the ports $H^2$, $H^3$. At one end of the part $e^2$ of the edge of the sleeve $e$ the edge is stepped up as shown at $e^3$ so as to increase the distance between the part $e^4$ of the edge beyond the step $e^3$ and the opposed edge of the sleeve F, while at the other end of the part $e^2$ of the edge the edge is stepped down as shown at $e^5$, so that the gap between the part $e^6$ of the edge beyond the step $e^5$ and the opposed edge of the sleeve F is reduced. Each step is preferably inclined, as shown, while the parts $e^4$ and $e^6$ of the edge are straight. Thus the formation of the edge of the sleeve is such that the three relatively stepped parts $e^2$, $e^4$ and $e^6$ lie respectively in three parallel planes normal to the sleeve axis, these planes being conveniently at equal distances apart while the inclined steps $e^3$ and $e^5$ are substantially the same height.

Thus if the sleeve $e$ is rotated through more than a small angle either in one direction or the other from that shown, which may be designated its intermediate position in which the effective opening of each of the ports $H^2$, $H^3$ is the same, it will result respectively in an increase or a decrease in the effective opening of one of the ports while leaving the effective opening of the other port substantially unaffected, it being understood that the effective opening or metering orifice of each port is represented by the part of the port lying between the edges of the sleeves e and F. The arrangement is such, however, that rotational movements of the sleeve e through a small angle in either direction from what may be called its mid position can take place without altering the effective area of either of the ports $H^2$, $H^3$.

Since, therefore, the total area of the metering orifice, represented by the combined areas at the two ports $H^2$, $H^3$, is not altered by such small movements from its mid position the fuel metering is not affected by air screw governor tolerance within certain permissible limits and the fuel metering error associated with the air screw governor tolerance may be completely eliminated.

On the other hand, if as a result of selecting a speed above the actual speed then existent, the sleeve e is rotated in one direction, say for example an anticlockwise direction, this will bring the sloping edge of a step $e^3$ over the metering port $H^3$ without, however, altering the flow through the port $H^2$, thus increasing the total flow area through the whole metering orifice. The flow increase thus selected will increase the amount by which the selected speed is in advance of the actual speed. On selecting a decrease in R. P. M. the sequence is similar but flows are reduced by the edge of the step $e^5$ being moved over the port $H^2$.

Similarly the effect of an increase in actual speed above the speed selected is to rotate the sleeve e in a clockwise direction to bring the step $e^5$ over the port $H^2$, thus decreasing the total flow area through the whole metering orifice and consequently decreasing the fuel flow or counteracting the increase in flow area and therefore fuel flow which would otherwise take place due to movement of the sleeve e in accordance with actual speed increase. This decrease in the flow will increase with the amount which the actual speed is above the selected speed.

Movement is imparted to the sleeve e by a link $a^3$ connected to one arm $a^4$ of a two-armed lever the other arm $a^5$ of which is connected by a link $f^1$ to a floating lever $g\ g^1$ having the same function as the floating lever $g\ g^1$ in the construction shown in Figure 2. Adjustable stops $d\ d^1$, similar in function to the stops $d\ d^1$ in Figure 2, also limit the maximum movement of the lever $a^4\ a^5$ while the sleeve F is controlled by a Bourdon tube O similar in function to the Bourdon tube O in Figure 2.

Figure 7:
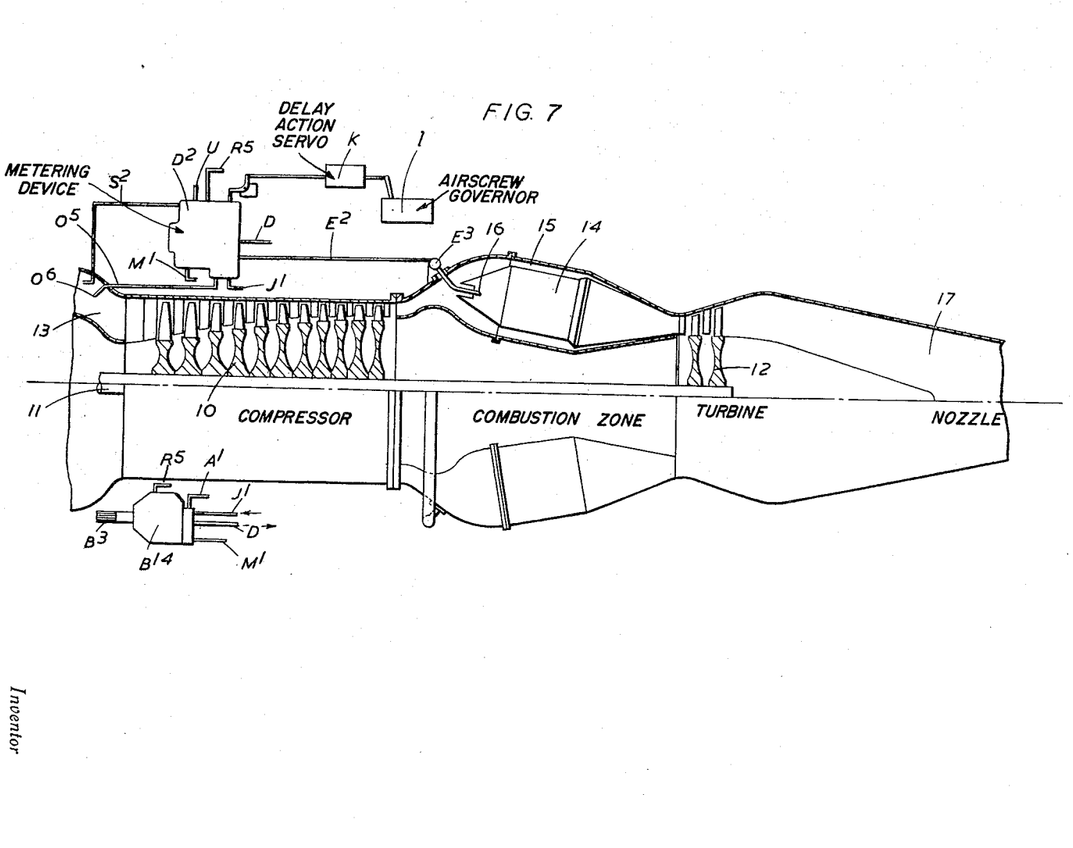
Fig. 7 is a diagrammatic representation of an internal combustion prime mover of the type with which the invention is more especially intended for use and showing the manner in which the present fuel metering may be associated therewith.

Figure 7 shows by way of example an internal combustion turbine prime mover of a type with which the present invention is more especially but not exclusively intended to be employed.

The prime mover here shown comprises an axial flow compressor 10 on a shaft 11 driven by a turbine 12. Air is drawn into the compressor through an intake 13 and is delivered into a number of separate combustion chambers 14 spaced equally apart around the shaft 11. Each combustion chamber 14 has an air jacket 15 and the air from the compressor 10 flows into the combustion chamber 14 past a burner 16 while some of this air flows through the jacket 15. Hot gases from the combustion chambers 14 act on the blades of the turbine 12 and then flow away through a passage 17 whence they may issue in the form of a propulsive jet. An airscrew, not shown in the drawing, is driven by the turbine through the shaft 11.

The casing $D^2$ enclosing all the parts of the metering apparatus, as shown in Fig. 3, is disposed in a position as indicated in Figure 7 at one side of the casing enclosing the compressor 10. In a convenient position opposite to the casing $D^2$ and as shown in Figure 7 there is placed the casing $B^{14}$ enclosing the fuel pump whose shaft $B^3$ is driven through gearing, not shown, from the turbine shaft 11.

The several pipes and connections between the metering apparatus in the casing $D^2$ and the fuel pump in the casing $B^{14}$ are indicated in Figure 7 by the same letters of reference as those parts are indicated in Fig. 3. Thus the piping $S^2$ leads from the air intake 13 so as to transmit the ram pressure at the air intake to the chamber $S^1$ enclosing the capsule S. There is a connection $O^5$ between a thermometer $O^6$ in the air intake 13 and the thermometer tube O which transmits movement to the lever $O^2$. The pipe U communicates with a supply of liquid under pressure which acts on the servo pistons P and $T^1$. The piping $R^4$ is the communication between the pump and the speed capsule $R^2$. The piping $J^1$ is the return to the fuel pump, while the piping D is that through which fuel is delivered by the pump to the metering unit in the casing $D^2$. The piping $E^2$ leads the metered fuel from the chamber $E^1$ to a manifold $E^3$ which communicates with the burners 16 in the combustion chambers 14. Finally the pipe $M^1$ leads to the servo cylinder containing the piston $B^4$ whose movement varies the stroke of the fuel pump.

What we claim as our invention and desire to secure by Letters Patent is:

1. Apparatus for metering the fuel supplied to a prime mover of the type indicated provided with a governor for controlling the pitch of a variable pitch air screw which comprises in combination a metering orifice the dimensions of which in directions at right angles are determined by parts of three sleeve members coaxial with and relatively movable within a cylinder, namely at least one port in an inner sliding sleeve, the edge of a second and outer sliding sleeve which passes across said port in the inner sleeve, and the edge of a third and outer sleeve which lies across the port in the said inner sleeve, the said edges of the second and third sleeves being spaced apart axially and these two sleeves being coaxial and together providing a cylindrical surface within which the said inner sleeve can move, a pump driven by and in speed relation to the prime mover and operative to deliver fuel in variable quantity to the said metering orifice, means for moving the said first and inner sleeve axially on the one hand in accordance with the speed at which the said fuel pump is driven and hence in accordance with the actual speed of the prime mover and on the other hand in accordance with the pressure of the fuel as supplied to the said fuel pump, means for moving the second of the said sleeve members in relation to the metering orifice in accordance with the temperature of the air at the entry to the compressor of the prime mover, a servo motor operative on the airscrew governor, control means for said servo motor, means for delaying the response of said servo motor to movements of said control means, a control lever, an operative connection between said control lever and the control means of said servo motor, a floating lever connected at one point to said ported inner sliding sleeve so that the position of this point of the floating lever depends on the actual speed of the prime mover, an operative connection between said control lever and a second point on said floating lever so that the position of this second point depends on the speed of the prime mover as selected by the control lever, and a connection between a third point on said floating lever and the said third and outer sliding sleeve so that the position of this sleeve depends both on the actual speed of the prime mover and on the speed selected by the control lever.

2. Apparatus for metering the fuel supplied to a prime mover of the type indicated and comprising the parts set forth in claim 1, in which the said third and outer sleeve is adapted to be moved by rotating it about its axis and on the inner ported sleeve, the operative edge of the third sleeve being stepped.

3. Apparatus for metering the fuel supplied to a prime mover of the type indicated and comprising the parts as set out in claim 1, wherein the operative connection between said control lever and the second point on said floating lever includes a cam mechanism.

4. Apparatus for metering the fuel supplied to a prime mover of the type indicated and comprising the parts as set out in claim 1 wherein said operative connections include a cam actuated by said control lever and adapted to act on said floating lever and a valve controlling said delayed action servo motor of the air screw governor.

5. Apparatus for metering the fuel supplied to a prime mover of the type indicated provided with a governor for controlling the pitch of a variable pitch air screw, which comprises in combination a metering orifice the dimensions of which at right angles are determined by parts of three members relatively movable within a cylinder, namely at least one port in an inner sleeve with means for sliding it in the direction of its axis, the edge of a second and outer sleeve which passes across said port in the inner sleeve with means for sliding this sleeve in the direction of its axis, and the edge of a third and outer sleeve which lies across the port in the said inner sleeve with means for moving this sleeve so as to vary the distance between its edge and the opposed edge of the said second and sliding sleeve, the said second and third outer sleeves being coaxial and together providing a cylindrical surface within which the said inner sleeve can slide, a pump driven by and in speed relation to the prime mover and operative to deliver fuel in variable quantity to the said metering orifice, means for moving the said first and inner sleeve in the axial direction, this movement on the one hand being in accordance with the speed at which the said fuel pump is driven and hence in accordance with the actual speed of the prime mover and on the other hand in accordance with the pressure of the fuel as supplied to the said fuel pump, means for moving the second of the said sleeve members in the axial direction in accordance with the temperature of the air at the entry to the compressor of the prime mover, a delayed action servo motor operative on the air screw governor, control means for said servo motor, means for delaying the response of said servo motor to movements of said control means, a control lever, an operative connection between said control lever and the control means of said servo motor, a floating lever connected at one point to said ported inner sliding sleeve so that the position of this point of the floating lever depends on the actual speed of the prime mover, an operative connection between said control lever and a second point on said floating lever so that the position of this second point depends on the speed of the prime mover as selected by the control lever, and a connection between a third point on said floating lever and the said third and outer sliding sleeve so that the position of this sleeve depends both on the actual speed of the prime mover and the speed selected by the control lever.

REGINALD HENRY DOUGLAS
         CHAMBERLIN.
CHARLES HORACE LIONEL WYNNE.
JOHN SKELLERN.

REFERENCES CITED

The following references are of record in the file of this patent:

UNITED STATES PATENTS

| Number | Name | Date |
|---|---|---|
| 2,089,873 | Benson | Aug. 10, 1937 |
| 2,398,586 | Maddox | Apr. 16, 1946 |
| 2,419,171 | Simpson et al. | Apr. 15, 1947 |
| 2,422,808 | Stokes | June 24, 1947 |
| 2,457,595 | Orr, Jr. | Dec. 28, 1948 |
| 2,474,033 | Chamberlin et al. | June 21, 1949 |

FOREIGN PATENTS

| Number | Country | Date |
|---|---|---|
| 525,878 | Germany | June 4, 1931 |